(12) United States Patent
Köhler

(10) Patent No.: US 11,543,209 B2
(45) Date of Patent: Jan. 3, 2023

(54) SIGHTING ARRANGEMENT COMPRISING A PRISM SYSTEM WITH A FLAT TOP SURFACE

(71) Applicant: NOBLEX E-Optics GmbH, Braunfels (DE)

(72) Inventor: Albrecht Köhler, Jena (DE)

(73) Assignee: NOBLEX E-Optics GmbH, Braunfels (DE)

( * ) Notice: Subject to any disclaimer, the term of this patent is extended or adjusted under 35 U.S.C. 154(b) by 0 days.

(21) Appl. No.: 17/383,122

(22) Filed: Jul. 22, 2021

(65) Prior Publication Data

US 2022/0026174 A1    Jan. 27, 2022

(30) Foreign Application Priority Data

Jul. 22, 2020   (DE) .................. 102020119309.2

(51) Int. Cl.
*F41G 1/30*    (2006.01)
*F41G 1/34*    (2006.01)

(52) U.S. Cl.
CPC .............. *F41G 1/30* (2013.01); *F41G 1/345* (2013.01)

(58) Field of Classification Search
CPC .................................. F41G 1/30; F41G 1/345
USPC .......................................................... 42/113
See application file for complete search history.

(56) References Cited

U.S. PATENT DOCUMENTS

| 4,764,011 A * | 8/1988 | Goldstein .......... G02B 27/0149 42/113 |
| 5,189,555 A * | 2/1993 | Jorlov .................. G02B 23/105 359/618 |
| 5,901,452 A * | 5/1999 | Clarkson .................... F41G 1/30 42/131 |
| 2009/0100735 A1* | 4/2009 | Schick .................... F41G 1/345 42/131 |
| 2013/0333266 A1 | 12/2013 | Gose et al. |
| 2017/0248798 A1* | 8/2017 | Zangerl .................... G02B 5/12 |

FOREIGN PATENT DOCUMENTS

| DE | 861 975 B | 1/1953 |
| DE | 100 46 878 A1 | 2/2002 |
| DE | 10 2015 105 751 B3 | 5/2016 |

* cited by examiner

*Primary Examiner* — Samir Abdosh
(74) *Attorney, Agent, or Firm* — Christensen, Fonder, Dardi & Herbert PLLC

(57) ABSTRACT

A sighting arrangement, comprising an illuminated mark and a prism system consisting of a first prism and a second prism which are connected to each other via a dichroic reflector surface, the prism system comprising a sight axis and a superimposition axis for imaging the illuminated mark onto a sighted target. The bottom surface, via which the imaging beam path emanating from the illuminated mark is coupled into the prism system, and the convexly curved mirror surface, which is absolutely necessary for collimating the imaging beam path, are located on the same side of the prism system, namely on the mounting side facing a device on which the prism system is mounted as intended. As a result, the prism system has a flat top surface which does not limit the field of view section determined by the visible edges of the prism system.

8 Claims, 3 Drawing Sheets

SIGHTING ARRANGEMENT COMPRISING A PRISM SYSTEM WITH A FLAT TOP SURFACE

PRIORITY CLAIM

The present application claims priority to German Patent Application No. 10 2020 119 309.2, filed on Jul. 22, 2020, which said application is incorporated by reference in its entirety herein.

FIELD OF THE INVENTION

The invention relates to a sighting arrangement for a reflex sight, as generically known from U.S. Pat. No. 5,901,452 A.

BACKGROUND OF THE INVENTION

Reflex sights—i.e., sighting devices with a reflected illuminated mark—work according to the principle that a self-luminous or illuminated target mark (illuminated mark), typically a dot, can be imaged to infinity via a concave mirror and captured by the eye, simultaneously with the sighted target, without accommodation.

These types of sights are typically almost non-magnifying sights equipped with a virtual illuminated mark imaged to infinity. Instead of reflex sights, they are also commonly referred to as red dot sights or collimator sights.

In most of these sights, the preferably red illuminated dot is generated by a light-emitting diode. The size of the light-emitting diode and the focal length of the collimator optics determine the apparent size of the illuminated dot. To achieve an illuminated dot with only a small target coverage, either a long focal length or a very small dot size must be selected. A long focal length means correspondingly large devices. A compact design therefore requires a relatively small focal length, while the aperture is comparatively large.

For such compact sighting devices, the focal length is usually in the range of 20-30 mm.

For a small size of the illuminated mark image, covering only a few angular minutes of a sighted target object, the diameter of the illuminated mark should be around 25 μm.

Compared to telescopic sights, reflex sights have the advantage that these systems do not require a predetermined distance for use between the sight and the eye. Therefore, said distance may be a few centimetres, but also more than one metre, without affecting operation. These sights are thus suitable for all devices allowing targets to be sighted with the unarmed eye, i.e. without aids. If the sight has no magnification, sighting with both eyes open is also possible. The field of view of the unarmed eye can thus be observed almost without restriction. Restrictions apply only to the eye that looks through the reflex sight. In this case, the restrictions are given by the edges of the optics or the frames that hold them in place. The field of view limited by the optics of the sight shall hereafter be understood as a field of view section. For comfortable sighting, with low overall construction height, this section should be larger in its horizontal extension compared to the vertical extension, preferably about twice as large.

Closed and open designs are known for reflex sights. In the closed design, the optics are usually mounted in a tube with lenses or cover plates. In an open design, the optics are self-contained. The latter design has the advantage of offering a field of view with an almost unobstructed view of the target. On the other hand, this design is usually susceptible to interference from environmental influences such as rain, snow and dirt, which can enter the beam path. In contrast thereto, the closed design is more robust and less susceptible to interference. The focus of application here is in the military sector, where robustness and waterproofness are of particular importance.

Two sights are known from published patent application DE 100 46 878 A1 and from U.S. Pat. No. 5,189,555 A, in which the illuminated mark is located within two bordering optical components. These types of sights are usually comparatively much larger and therefore also heavier. Another disadvantage is the limited angle of vision when looking through the sight with only one eye, which is indispensable at least when the sight has magnification.

In a reflex sight disclosed in German patent DE 861 975 B, an illuminated mark enters a prism system consisting of two prisms via a deflecting prism at right angles to an optical axis of the reflex sight. The illuminated mark is a reticle illuminated in a collimated beam path. The prism system forms a cuboid glass block, at the diagonal section of which the prisms form a semi-transparent reflector surface. The illuminated reticle is superimposed on the optical axis at the reflector surface, and a concave mirror having a rotationally symmetric curvature realises imaging to infinity prior to superimposition. The concave mirror is arranged in the entrance direction of the illuminated reticle, on the outside of the prism system and forms an air lens between the prism system and the concave mirror. The disadvantage of this solution is the relatively high number of optical elements required to create and image the illuminated mark.

A reflex sight described in published patent application U.S. 2013/0333266 A1 uses a prism system consisting of two prisms joined together in a cuboid shape. The joining surface is a semi-transparent surface and extends diagonally through the prism system. An illuminated mark is superimposed on the sighted target at the semi-transparent surface. As an illuminated mark, a microdisplay is advantageously used with which different illuminated marks can be generated in principle. The prism system has an entrance surface and, parallely opposite thereto, an exit surface through which a light beam coming from the sighted target can pass through the prism system. At right angles to the entrance and exit surfaces, above and below the light beam, the prism system has top and bottom surfaces which are parallely opposite each other. These surfaces are each connected to a rotationally symmetric parabolic mirror. Via the parabolic mirror connected to the top surface, the illuminated mark is superimposed on the light beam coming from the target. For this purpose, the light emitted from the microdisplay positioned centrally at the edge between the bottom surface and the exit surface is reflected at an angle from the parabolic mirror to the semi-transparent surface and thereby collimated. Due to the short optical path length for the light of the microdisplay, the parabolic mirrors built up on the bottom and top surfaces are relatively strongly curved. Due to the curvature, the edges outside the entrance and exit surface of the reflex sight are unfavourably widened into extended edge regions.

From the aforementioned U.S. Pat. No. 5,901,452 A, a compact reflex sight is known, which is referred to there as a gunsight and comprises a beam-splitting prism system, via which an illuminated mark can be imaged to infinity and a target at infinity can be viewed standing. The prism system consisting of two connected prisms has the shape of a cuboid, preferably a cube, with five functional surfaces. A first functional surface is the connecting surface of the two prisms, which extends diagonally through the interior of the prism system, is referred to as a beam splitter surface and is provided with a semi-transparent coating. The second to fifth functional surfaces are external functional surfaces, of which the second and third functional surfaces, related to a gun on which the prism system is mounted, are designated as the bottom and top surfaces, and the fourth and fifth functional surfaces, related to the direction of incidence of the light coming from the direction of the sighted target, are designated as the entrance and exit surfaces. The entrance surface and the exit surface are arranged parallel to each other so that the prism system acts like a planar plate for light entering the entrance surface and exiting through the exit surface.

The top surface is embodied as a curved rotationally symmetric mirror surface with a focal point, the axis of symmetry of the mirror surface coinciding with a surface normal of the bottom surface and the focal point of the mirror surface lying on the bottom surface. Like a conventional beam splitter cube, the beam splitter surface is arranged diagonally between the entrance surface and the exit surface. An illuminated mark located at the focal point of the mirror on the prism system is thus imaged through the beam splitter surface via the mirror surface back onto the beam splitter surface, from where it is reflected through the exit surface. The light is collimated by the mirror surface and ideally exits the prism system as a parallel beam. An observer looking through the prism system on the side of the exit surface thus sees the illuminated mark and the sighted target simultaneously with the same eye, without accommodation, at infinity within a field of view section.

A disadvantage of a sight according to the aforementioned U.S. Pat. No. 5,901,452 A is given by the strong curvature of the mirror surface, the radius of which is directly determined by the distance of the top surface from the bottom surface and thus by the construction height of the prism system. Said curvature increases as the construction height decreases. This means that, in order to achieve a small construction height, a strong curvature must be accepted, which severely limits a maximum width of the prism system, determined by the distance between the lateral surfaces which are not functional surfaces. The advantages of an open design, in which the field of view section is limited only by the edges of the optics, are considerably restricted here by the strong curvature of the mirror surface. The greater the curvature and the greater the distance between the lateral surfaces of the prism system in order to make the field of view section limited by the prism system appropriately wide, the greater is an edge region formed by the mirror surface, visible from the exit surface and bordering the upper edge of the prism system, by which the height of the field of view section is reduced.

A sighting arrangement with a prism system is known from DE 10 2015 105 751 A1, in which the prism system has a comparatively narrower edge region bordering its upper edge, so that a comparatively larger part of the beam power is used to image the target mark. Even though this edge region is very narrow, it is also impossible to see through this edge region by which the height of the field of view section is reduced. In order to make the edge region narrow, the mirror surface has only a slight curvature, which requires a long focal length. The long focal length is made possible by folding the beam path over several reflecting planar surfaces. For this purpose, the prism system is extended in the direction of the sight axis and thus has a comparatively higher weight.

SUMMARY OF THE INVENTION

The object of the invention is to provide an improved sighting arrangement for a reflex sight, in which the prism system whose edges border a field of view section does not have any edge regions restricting the field of view section.

This object is achieved by a sighting arrangement according to the invention, comprising an illuminated mark and a prism system consisting of a first prism and a second prism which are connected to each other via a dichroic reflector surface. The dichroic reflector surface encloses an angle with a sight axis which is orthogonal to an entrance surface present on the first prism and to an exit surface parallel thereto present on the second prism. On the second prism, there is a convexly curved mirror surface that has a vertex and a focal point, said focal point defining a superimposition axis together with the vertex. The focal point is located on a bottom surface formed on the first prism or at a distance from the bottom surface, outside the prism system, where the illuminated mark is also positioned. The superimposition axis and the sight axis coincide between the exit surface and the dichroic reflector surface.

It is essential to the invention that the angle is greater than 45°, less than 90° and that the first prism has a planar mirror surface arranged opposite the convexly curved mirror surface, which is arranged on a mounting side of the prism system, said planar mirror surface also being arranged orthogonally to the entrance surface and to the exit surface. On the planar mirror surface, the superimposition axis is folded once between the bottom surface and the dichroic reflector surface.

As a result, the essential feature of the invention is that the bottom surface, via which the imaging beam path emanating from the illuminated mark 7 is coupled into the prism system, and the convexly curved mirror surface, which is absolutely necessary for collimating the imaging beam path, are located on the same side of the prism system, namely on the mounting side facing a device on which the prism system is mounted as intended.

Advantageously, two or a multiple of two further planar mirror surfaces are present between the planar mirror surface and the convexly curved mirror surface.

It is also advantageous if the bottom surface is parallel to the planar mirror surface.

BRIEF DESCRIPTION OF THE DRAWINGS

The invention will be explained in more detail below with reference to an exemplary embodiments and with the help of drawings, wherein.

DETAILED DESCRIPTION

Figure 1:
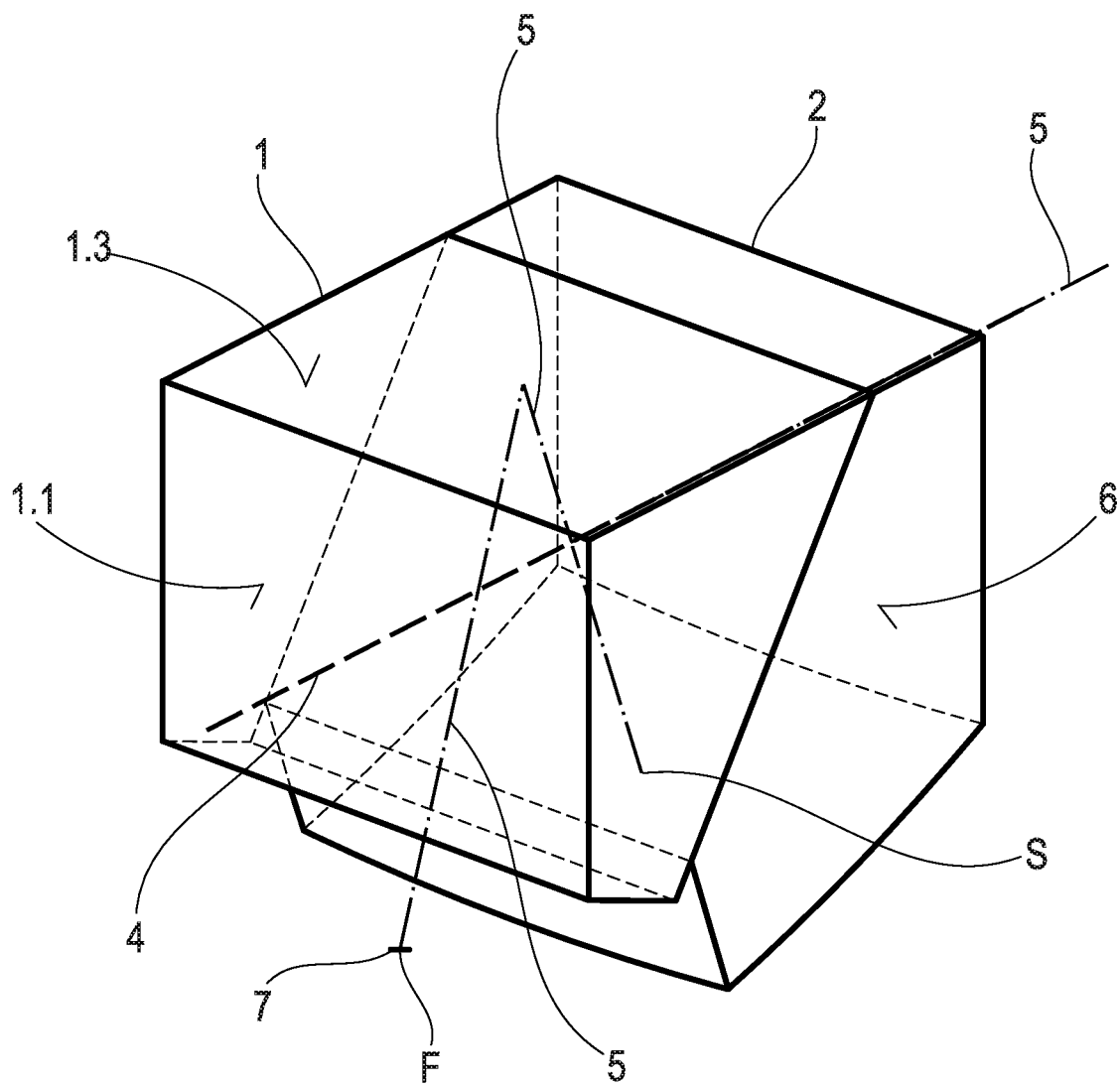
FIG. 1 shows a three-dimensional view of a sighting arrangement according to the invention.
Figure 2:
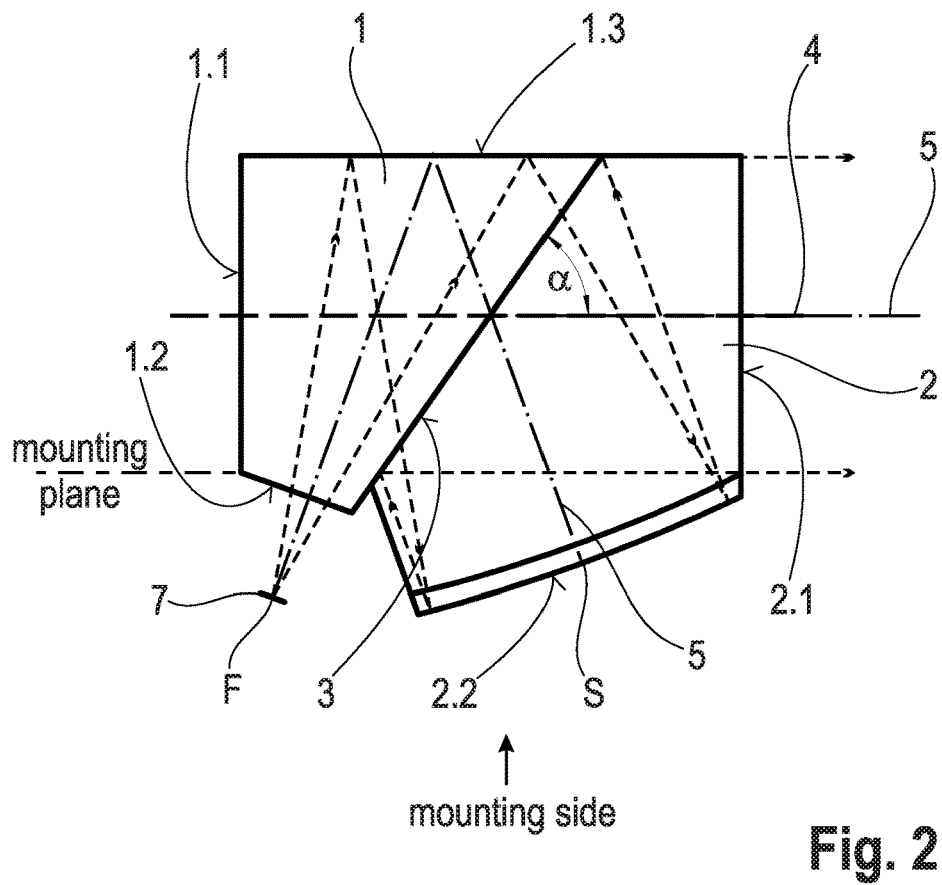
FIG. 2 shows a lateral view of the sighting arrangement according to FIG. 1 including the imaging beam path of the illuminated mark.
Figure 3:
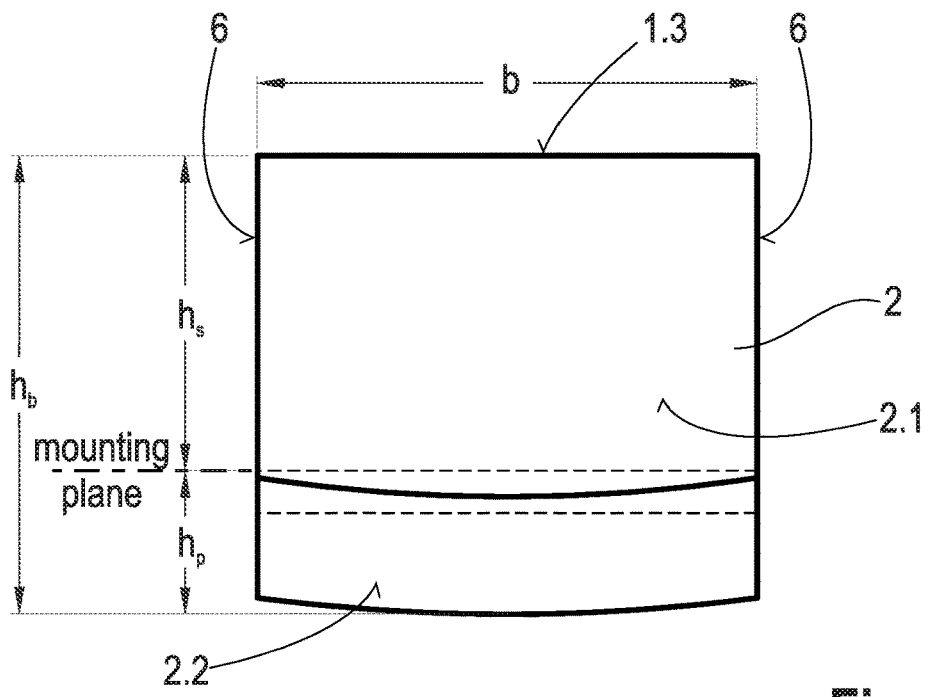
FIG. 3 shows a rear view of the sighting arrangement according to FIG. 1.

A sighting arrangement according to the invention, shown in FIGS. 1 to 3, includes an illuminated mark 7 and a prism system formed by a first prism 1 and a second prism 2. The prisms 1, 2 are connected to each other via a dichroic reflector surface 3, which is inclined at an angle α to the optical axis, hereafter referred to as the sight axis 4, between an entrance surface 1.1 present on the first prism 1 and an exit surface 2.1 present on the second prism 2 and arranged parallel to the entrance surface 1.1.

The sight axis 4 is orthogonal to the entrance surface 1.1 and to the exit surface 2.1, so that the prism system acts as a plane-parallel plate for the imaging of a target sighted on the sight axis 4 in the eye of an observer and is thus non-refractive.

For the superimposition of an illuminated mark 7 onto the sight axis 4, a bottom surface 1.2 for the entry of the imaging beam path into the prism system, a planar mirror surface 1.3 for a first reflection, a convexly curved mirror surface 2.2 for a second reflection as well as collimation, and the dichroic reflector surface 3 for a third reflection in the direction of the sight axis 4 are provided on the first prism 1 along a further optical axis, hereinafter referred to as the superimposition axis 5, in the direction of the imaging of the illuminated mark 7. In the case of the convexly curved mirror surface 2.2 present on the second prism 2, it is assumed in a simplified manner for an easily understandable description of the invention that this is a spherical mirror surface with a vertex S and a focal point F. The optical distance between the focal point F and the vertex S represents the back focal length of the convexly curved mirror surface 2.2. The prism system is dimensioned such that the focal point F is either on the bottom surface 1.2 or at a distance from the bottom surface 1.2 outside the prism system (see FIG. 2).

For the intended use of the prism system, it is placed on a device to be aligned with a target, in particular on a hand-held firearm, in such a way that the sight axis 4 extends parallel to a shooting axis of the device. The bottom surface 1.2 and the convexly curved mirror surface 2.2 are arranged facing the device on a mounting side of the prism system. Accordingly, the planar mirror surface 1.3 on the first prism 1 is part of the top surface of the prism system connecting the entrance surface 1.1 and the exit surface 2.1. The bottom surface 1.2 can be arranged inclined to the planar mirror surface 1.3 so that the superimposition axis 5 is orthogonal to it.

Figure 4:
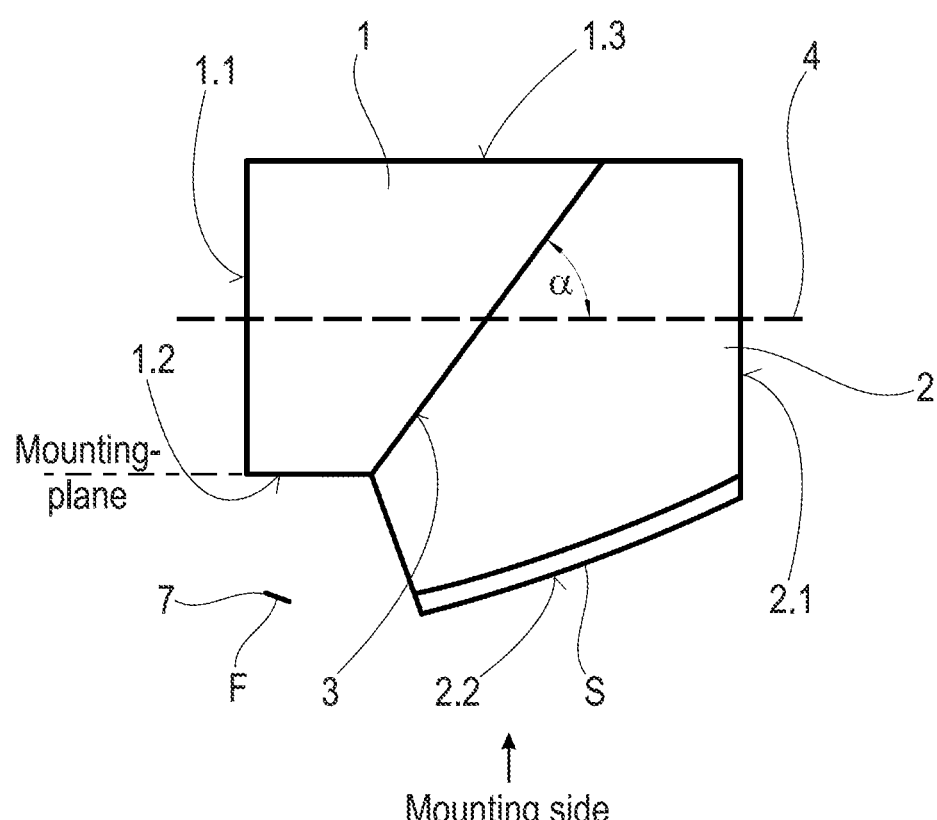
FIG. 4 shows a lateral view of another sighting arrangement, including the imaging beam path of the illuminated mark.

Referring also to FIG. 4, advantageously, however, since this is easier to produce, bottom surface 1.2 can alternatively be arranged parallel to the planar mirror surface 2.1, which is negligible for the quality of the image of the illuminated mark 7 due to the narrow-band wavelength spectrum with which the illuminated mark 7 is illuminated or with which it glows.

It is common for prism systems of sighting arrangements to be inserted in a prism holder when connected to the weapon. A prism system according to the invention is connected to a prism holder or the device itself for mounting on a device as intended in such a way that the bottom surface 1.2 and the convexly curved mirror surface 2.2 are enclosed by the prism holder or the housing of the device below a mounting plane, but the entrance surface 1.1 and the exit surface 1.2 lie above the mounting plane and are not limited by the prism holder or the housing.

If the illuminated mark 7 is arranged outside the prism system, the illuminated mark 7 is advantageously attached to the prism holder or to the housing of the device. The attachment is advantageously adjustable in order to align the illuminated mark 7 exactly in the focal point of the convexly curved mirror surface 2.2.

The prism system of a sighting arrangement according to the invention differs from that of the aforementioned U.S. Pat. No. 5,901,452 A essentially in that, in addition to the aforementioned five functional surfaces, namely the dichroic reflector surface 3, the entrance surface 1.1, the exit surface 2.1, the convexly curved mirror surface 2.2 and the bottom surface 1.2, there is exactly one further functional surface which is formed by the planar mirror surface 1.3.

The planar mirror surface 1.3 is arranged orthogonally to the entrance surface 1.1, bounding the first prism 1, between the entrance surface 1.1 and the exit surface 2.1. The projection of the planar mirror surface 1.3 in the direction of the sight axis 4 thus only represents a line that coincides with an upper edge of the entrance surface 1.1, which is why the top surface of the prism system is flat. In contrast to the sighting arrangements according to the aforementioned U.S. Pat. No. 5,901,452 A and also the aforementioned DE 10 2016 105 751 A1, the convexly curved mirror surface 2.2 does not create an edge region limiting the field of view section, since the convexly curved mirror surface 2.2 is arranged below the mounting plane of a device which limits the field of view section towards the device.

Like known sighting arrangements, the beam reflected and collimated via the convexly curved mirror surface 2.2 is deflected via the dichroic reflector surface 3 in the direction of the sight axis 4, and the superimposition axis 5 and the sight axis 4 coincide. The radius of curvature of the convexly curved mirror surface 2.2 is selected such that its back focal length is equal to or slightly longer than the path of the axial ray of the beam which the latter travels between the bottom surface 1.2 and the convexly curved mirror surface 2.2.

As shown in FIG. 2, a beam emanating from the illuminated mark 7 is reflected at the planar mirror surface 1.3 before it impinges on the dichroic mirror surface 2.2, so that, in comparison with the aforementioned U.S. Pat. No. 5,901,452 A, the focal length, determined by the radius of curvature and the refractive index of the material of the prism system, and thus also the back focal length is longer. Practically, the focal length F could be further increased by providing two or even a multiple of two more planar mirror surfaces between the planar mirror surface 1.3 and the convexly curved mirror surface 2.2. This would have the advantage that for a given width b of the prism system and thus the width of the field of view section, the construction height $h_b$ can be reduced. The construction height $h_b$ is greater than a height $h_s$ of the field of view section, at least by the projection height $b_p$, which results from the projection of the convexly curved mirror surface 2.2 in the direction of the sight axis 4. As already explained, when the prism system is mounted on a device in the intended manner, the convexly curved mirror surface 2.2 does not lie within the field of view section which is limited by the visible edges of the sighting system which the eye perceives when sighting. A mounting plane on the device is perceived as the lower edge. Regardless of its radius of curvature, the convexly curved mirror surface 2.2 lies below said mounting plane, which is why the projection of the convexly curved mirror surface 2.2 in the direction of the sight axis does not form an edge region limiting the field of view section. However, it influences the distance of the sight axis 4 to the axis of a firearm on which the prism system is mounted as intended, which is why a large radius of curvature, i.e. a small curvature, is advantageous.

The function of the planar mirror surface 1.3 is basically not the folding of the imaging beam path for the purpose of extending the focal length, but the fact that the bottom surface 1.2, via which the imaging beam path emanating from the illuminated mark 7 is coupled into the prism system, and the convexly curved mirror surface 2.2, which is absolutely necessary for collimating the imaging beam path, are located on the same side of the prism system, namely on the mounting side facing a device on which the prism system is mounted as intended.

The edges of the prism system which limit the field of view section are only limited by the visible edges of the entrance surface 1.1 or the exit surface 2.1 in addition to the mounting plane. However, these can have a certain width due to structurally necessary means such as chamfers, which are formed in glass components to prevent and eliminate cracks. When aiming, the user sees a prismatic body with planar entrance and exit surfaces and a top surface that is planar with respect to the housing of the device. The side surfaces along the sighting line can be designed to be inclined with respect to the top surface to allow impact without damage. Advantageously, the entrance surface 1.1 and the exit surface are identical in shape and size.

With the extension of the first prism 1, when arranging several planar mirror surfaces, the viewing window height $h_s$ can be reduced while maintaining the radius of curvature and thus the focal length, whereby the viewing window height $h_s$ of the prism system can be realised in a manner optimally adapted to the required circumstances, independent of the focal length. If there is only a slight curvature, the width b, determined by the distance between the lateral surfaces 6 of the prism system, can also be chosen comparatively large in relation to the height $h_s$, namely more than twice as large. For a great number of sighting situations, a field of view section with a large width is desired, although its height can be comparatively small. Accordingly, the prism system has a comparatively large width b, which corresponds, in this case, to the construction width and the viewing window width, and a comparatively low viewing window height $h_s$ is sufficient.

As in the prior art, the illuminated mark 7 can be an illuminated mark or advantageously a light source, for example in the form of an LED, in particular a light-emitting diode in the red spectrum. The wavelength range here is relatively narrow-band, which is why the reflective coatings only have to be designed for this wavelength range. As the focal length can be comparatively long, the need for the smallest possible illuminated mark, which can only be realised by masking the light exit surface of a light source, i.e. an illuminated mark, is alleviated.

The use of a spherical surface has the disadvantage that not all rays of the beam emanating from the illuminated mark 7 are imaged to infinity. This image error is due to the spherical aberration of a spherical lens surface. Since this type of sight is intended to provide a large, clear field of view section, the curved mirror surface, which acts like a lens segment, is made larger than directly necessary. This also increases the system-related image errors. In particular, it is unfavourable if the pupil of the eye is not arranged on the sight axis 4 but displaced towards an edge of the exit surface 2.1, which is referred to as an off-axis gaze. Due to the spherical aberration, the effect is that the image of the illuminated mark 7 is created at a different distance than that at which the target object is located. In conjunction with the off-axis gaze through the sight, there is a sighting error known as parallax error, caused by the different distances of the target object and the image of the illuminated mark 7. The parallax is expressed in the sense that a different position of the target object is perceived depending on the distance of the eye from the sight axis 4, although the position of the sight as such is not changed. Also, this error cannot be prevented by adjustment measures, since the coincidence of the image and object planes has already been established on the sight axis 4.

To avoid a possible parallax error, the convexly curved mirror surface 2.2 can advantageously be designed not as a spherical mirror surface, but as an aspherical mirror surface in the form of a paraboloid of rotation. As is generally known, all rays emanating from the focal point of a parabola are reflected in an ideal manner as a parallel light beam. Spherical aberration and distortion are also completely eliminated by such a parabolic mirror surface.

Advantageously, the first and second prisms 1, 2 may be made of a plastic material if the operating temperature of the sight permits the use of a plastic material. The plastic parts can be produced in a moulding process, e.g. by injection moulding, or in a shaping process.

However, plastics also have disadvantages compared to glass in robust use, such as lower scratch resistance and only low resistance to solvents and cleaning agents.

In a straight view along the sight axis 4, the magnification remains completely unchanged. Dispersion also does not occur when the same materials are chosen for the individual prisms. Only through the dichroic reflector surface 3 are there partial transmission losses.

LIST OF REFERENCE NUMERALS

1 first prism
1.1 entrance surface
1.2 bottom surface
1.3 planar mirror surface
2 second prism
2.1 exit surface
2.2 convexly curved mirror surface
3 dichroic reflector surface
4 sight axis (shown as a dashed line)
5 superimposition axis (shown as a dashed/dotted line)
6 lateral surface
7 illuminated mark
F focal point
S vertex
$h_s$ viewing window height
b width
α angle
$h_b$ construction height
$h_p$ projection height

The invention claimed is:
1. A sighting arrangement, comprising:
an illuminated mark, and
a prism system consisting of a first prism and a second prism which are connected to one another via a dichroic reflector surface which encloses an angle with a sight axis which is orthogonal to an entrance surface present on the first prism and to an exit surface parallel thereto and present on the second prism, wherein a convexly curved mirror surface is present on the second prism, which convexly curved mirror surface has a vertex and a focal point, said focal point defining a superimposition axis together with the vertex and being located on a bottom surface formed on the first prism, where the illuminated mark is also positioned, and wherein the superimposition axis and the sight axis coincide between the exit surface and the dichroic reflector surface, and
wherein the angle is greater than 45°, less than 90° and the first prism has a planar mirror surface arranged opposite the convexly curved mirror surface, which is arranged on a mounting side of the prism system, said planar mirror surface also being arranged orthogonally to the entrance surface and to the exit surface, at which planar mirror surface the superimposition axis is folded once between the bottom surface and the dichroic reflector surface.

2. The sighting arrangement according to claim 1, wherein two or a multiple of two further planar mirror surfaces are present between the planar mirror surface and the convexly curved mirror surface.

3. The sighting arrangement according to claim 1, wherein the bottom surface is parallel to the planar mirror surface.

4. The sighting arrangement according to claim 2, wherein the bottom surface is parallel to the planar mirror surface.

5. A sighting arrangement, comprising:
an illuminated mark, and
a prism system consisting of a first prism and a second prism which are connected to one another via a dichroic reflector surface which encloses an angle with a sight axis which is orthogonal to an entrance surface present on the first prism and to an exit surface parallel thereto and present on the second prism, wherein a convexly curved mirror surface is present on the second prism, which convexly curved mirror surface has a vertex and a focal point, said focal point defining a superimposition axis together with the vertex and being located a distance from a bottom surface formed on the first prism, outside the prism system, where the illuminated mark is also positioned, and wherein the superimposition axis and the sight axis coincide between the exit surface and the dichroic reflector surface, and wherein the angle is greater than 45°, less than 90° and the first prism has a planar mirror surface arranged opposite the convexly curved mirror surface, which is arranged on a mounting side of the prism system, said planar mirror surface also being arranged orthogonally to the entrance surface and to the exit surface, at which planar mirror surface the superimposition axis is folded once between the bottom surface and the dichroic reflector surface.

6. The sighting arrangement according to claim 5, wherein two or a multiple of two further planar mirror surfaces are present between the planar mirror surface and the convexly curved mirror surface.

7. The sighting arrangement according to claim 5, wherein the bottom surface is parallel to the planar mirror surface.

8. The sighting arrangement according to claim 7, wherein the bottom surface is parallel to the planar mirror surface.

\* \* \* \* \*